(No Model.) 4 Sheets—Sheet 1.
F. A. HOPKINS.
DRAWING BOARD.
No. 389,472. Patented Sept. 11, 1888.
Fig. I.
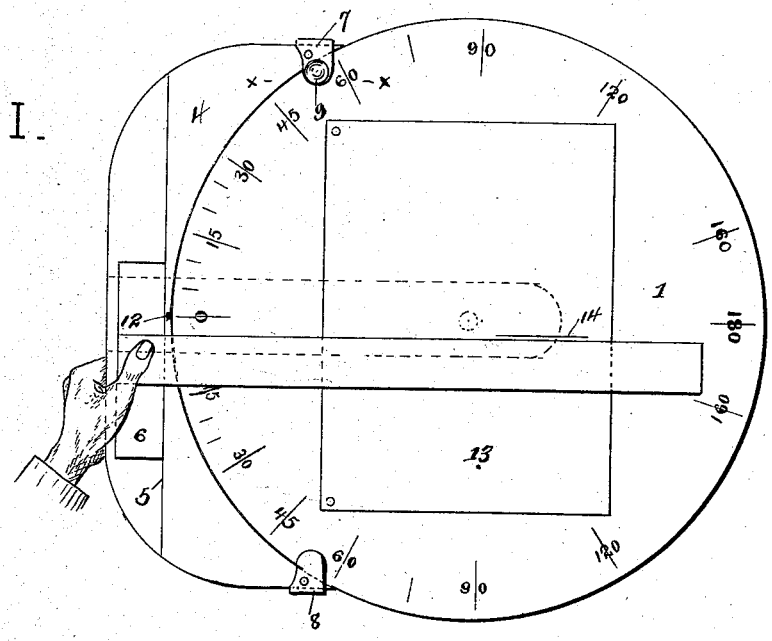
Fig. III.
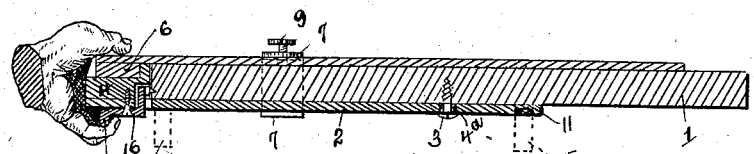
Fig. II.
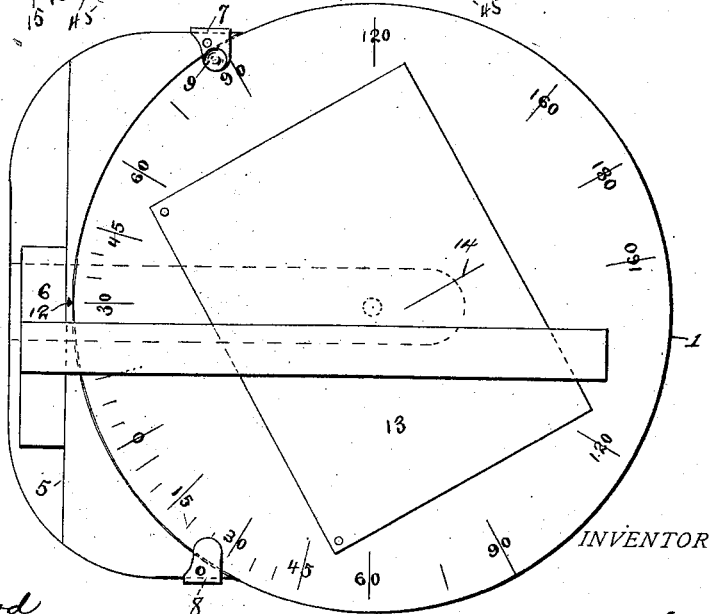
WITNESSES,
Clement Smallwood
H. S. Knight
INVENTOR.
F. A. Hopkins (No Model.)
F. A. HOPKINS.
DRAWING BOARD.
No. 389,472. Patented Sept. 11, 1888.
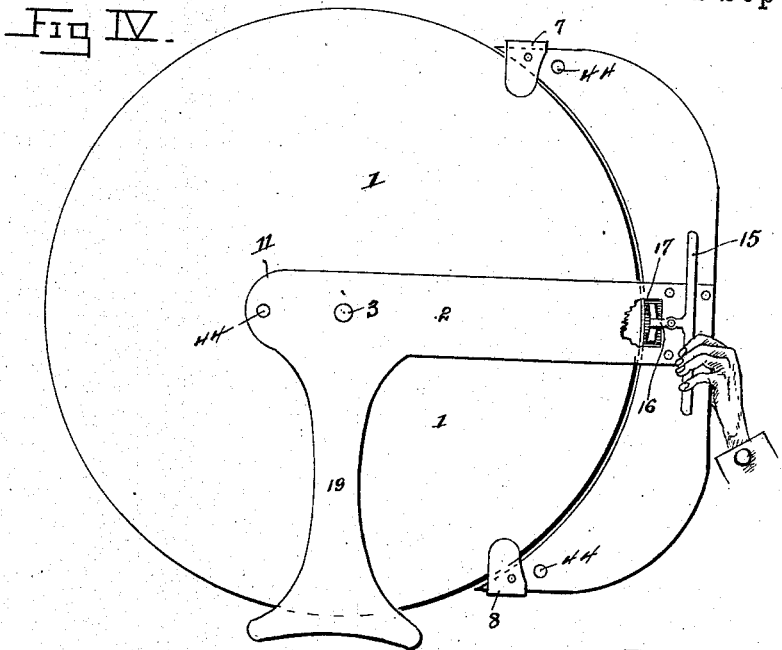
Fig IV.
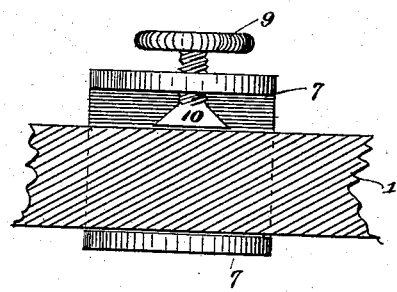
Fig. V.
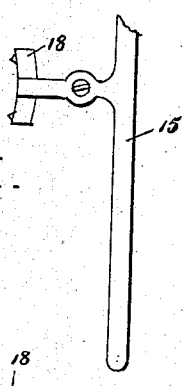
Fig VI.
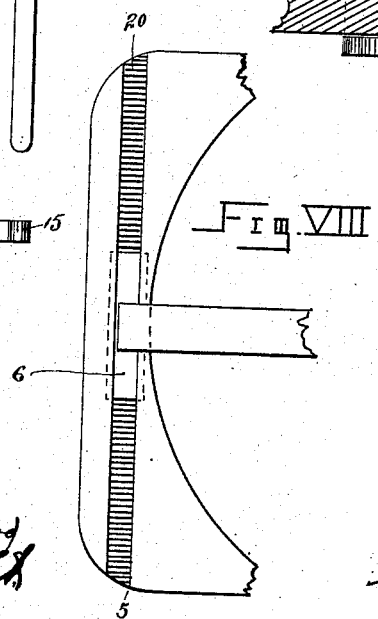
Fig VII.
Fig. VIII.
WITNESSES,
Clement Smallwood
H. S. Knight
INVENTOR.
F. A. Hopkins (No Model.) 4 Sheets—Sheet 3.
F. A. HOPKINS.
DRAWING BOARD.
No. 389,472. Patented Sept. 11, 1888.
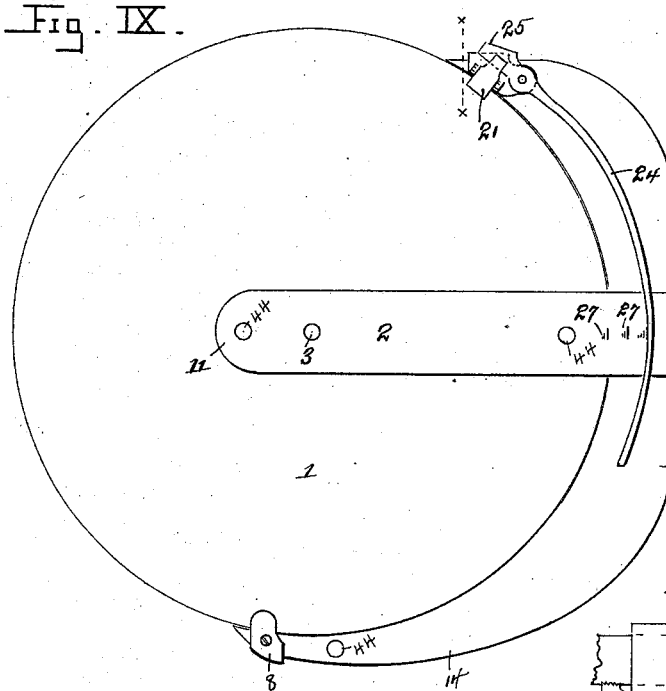
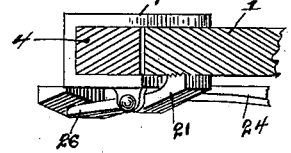
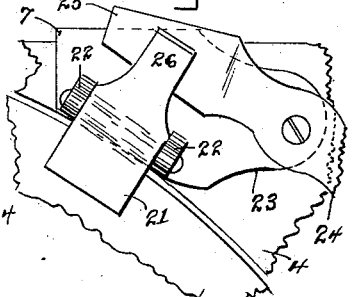
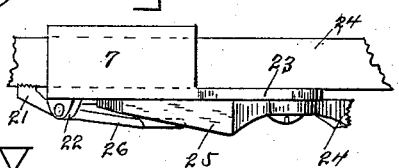
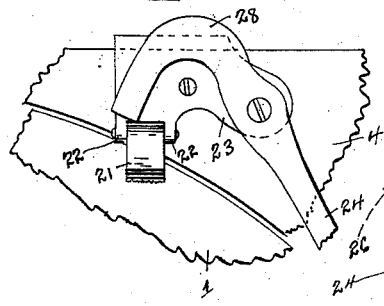
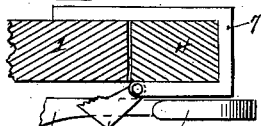
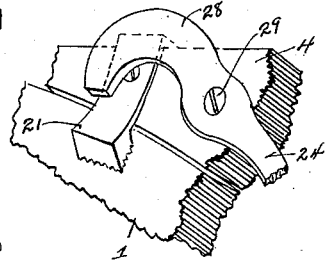
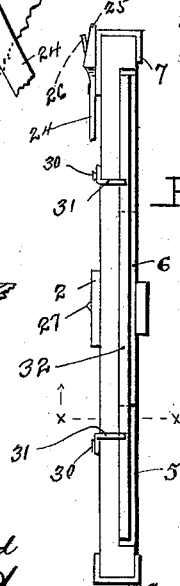
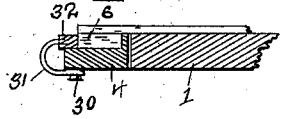
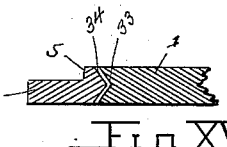
WITNESSES,
Clement Smallwood
H S Knight
INVENTOR.
F. A. Hopkins (No Model.)
F. A. HOPKINS.
DRAWING BOARD.
No. 389,472. Patented Sept. 11, 1888.
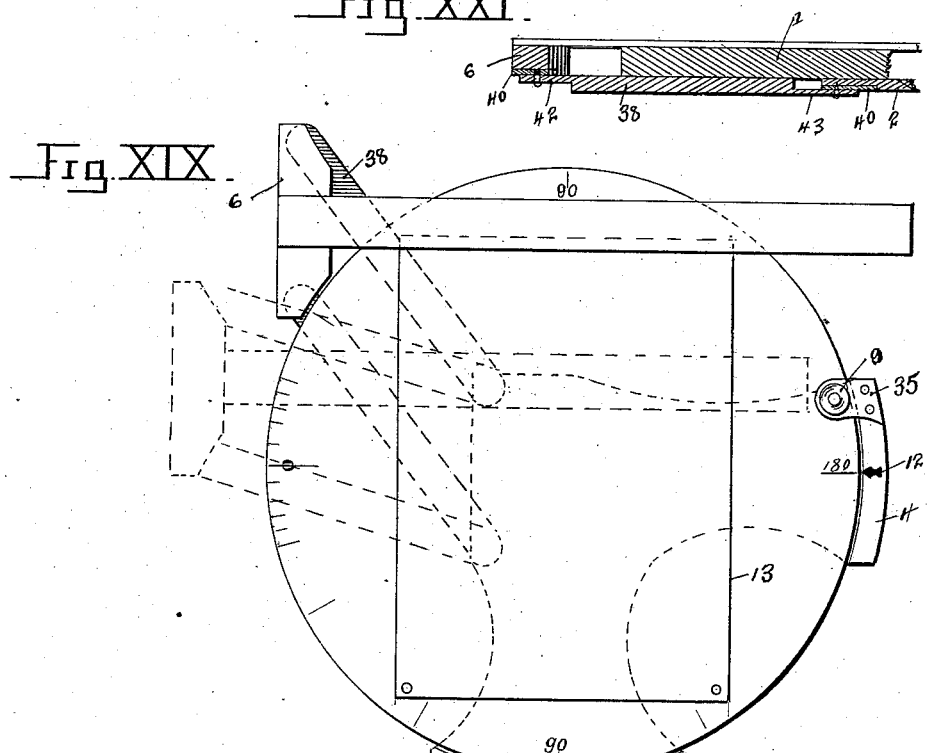
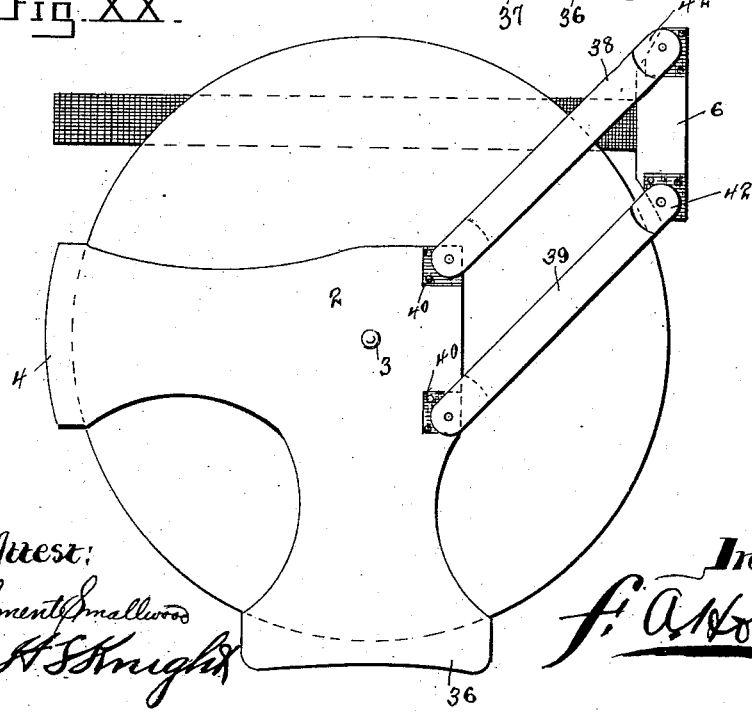
Attest:
Clement Smallwood
H S Knight
Inventor:
F. A. Hopkins

United States Patent Office.

FRANCIS A. HOPKINS, OF WASHINGTON, DISTRICT OF COLUMBIA.

DRAWING-BOARD.

SPECIFICATION forming part of Letters Patent No. 389,472, dated September 11, 1888.

Application filed May 22, 1888. Serial No. 274,715. (No model.)

*To all whom it may concern:*

Be it known that I, FRANCIS A. HOPKINS, a citizen of the United States, residing at Washington, in the District of Columbia, have invented certain new and useful Improvements in Drawing-Boards, of which the following is a specification.

My invention relates to those devices upon which the drawing-paper may be tacked or otherwise secured while the drawing is being made; and it has for its object to provide a device of this kind that will be less cumbersome, will avoid the necessity of a triangle and also a protractor, and will be much more convenient and handy than the devices of this nature heretofore known.

In making drawings of ordinary size it is customary and most convenient for the draftsman to tip the board on the edge of the table and hold it and the T-square in the same hand, while the lower edge of the board rests against the user's body. Now, when the triangle is to be used the board must again be laid flat upon the table in a very inconvenient position, as there is no way of holding the triangle in addition to the board and square. It is also known that the board frequently has to be turned upside down and end for end in order to make certain lines, which is exceedingly inconvenient and laborious to the draftsman. Therefore, in order to obviate these difficulties, I make the board proper of perfectly circular form, so as to avoid all corners or other irregularities capable of catching the clothing, and pivot the T-square or ruler or other straight-edge to the board in the manner hereinafter described, and mark the degrees on the perimeter of the board, which register with an index carried by the portion to which the board is pivoted, whereby the drawing-paper may be readily turned upside down or end for end at will and lines at any angle may be drawn thereon simply by the employment of the T-square or its equivalent.

In order that my invention may be fully understood, I will now proceed to describe the same with reference to the accompanying drawings, in which—

Figure I is a plan or face view of one form of my board, showing the manner of holding the T-square and its guiding-edge in one hand and the board in position for drawing a line parallel with the horizontal diameter of the paper. Fig. II is a similar view, but showing the board turned into position for drawing a line at thirty degrees to the horizontal diameter of the paper. Fig. III is a section through the center of the board and also the square. Fig. IV is a rear or bottom view showing the position of the hand and a guard for resting against the body. Fig. V is an enlarged detail section on the line $x\,x$, Fig. I. Fig. VI is an enlarged detail view of one form of brake employed. Fig. VII is a side elevation of the same. Fig. VIII is a view of the shoe which fits on the edge of the board, showing the head of the T-square dovetailed therein. Fig. IX is a rear or bottom view showing one form of brake applied to the board and a guard for resting against the body made integral with the shoe. Fig. X is an enlarged section on the line $x\,x$, Fig. IX. Fig. XI is an enlarged bottom view of the same. Fig. XII is an enlarged side elevation of the same. Figs. XIII and XIV are respectively an enlarged bottom and side elevation of another form of brake. Fig. XV is a perspective view of still another form of brake. Fig. XVI is an edge view of the shoe, showing a spring-actuated follower for holding the head of the T-square in place. Fig. XVII is a section of the same on the line $x\,x$, Fig. XVI. Fig. XVIII is a transverse section of the shoe and board, portion being broken away, showing the board provided with a peripheral groove and the shoe with a beveled edge for fitting in the same. Fig. XIX is a top or face view of the board, showing the T-square or ruler pivoted thereto by means of parallel arms. Fig. XX is a bottom view of the same; and Fig. XXI is a section of the same, portion broken away, taken longitudinally through one of the arms.

The various forms will now be specifically described in the order in which they occur, and reference will be made with like figures to like parts throughout the several views.

1 is the circular drawing-board, pivoted at its center to an arm or piece, 2, by means of a screw, 3, which, if the arm be of wood, is provided with a metal bearing or sleeve, $4^a$, for preventing wear. Suitably secured at the outer end of this arm or piece 2, flush with the board 1, is a shoe, 4, which fits the edge of the board and has its outer corners rounded off, so as to occupy as little room as possible and to avoid the liability of catching in the user's clothing, and has a straight guiding-edge, 5, for the head 6 of the T-square, formed by a rabbet or groove of sufficient depth to bring the head of the T-square flush with the board. Secured to this shoe, at its upper and lower ends, are brackets or guides 7 8, respectively, which have overhanging lips or plates, which prevent the board wabbling in a plane parallel with its axis. The upper one, 7, of these brackets has its top lip or plate slightly elevated from the board, and a set-screw, 9, having a broad bearing-head, 10, is screwed therein with its head adapted to impinge the board, and thus hold the latter firmly in any desired position. The one extremity 11 of the arm or piece 2 projects considerably beyond the center of the board, so as to insure against straining the pivot.

Directly in the center of the edge 5, on the edge of the shoe 4, is formed an index, 12, and one hundred and eighty degrees are marked on the outer edge of the upper and lower halves of the board 1, beginning at the same point. Now of course it is understood that when it is desired to draw horizontal lines upon the paper 13 the board is revolved until naught registers with the index, whereupon the board may be locked by the set-screw 9 and as many of the lines 14 drawn as desired; and now if it be desired to draw at an angle to the line 14—for example, at an angle of thirty degrees—the board is revolved in either direction, according to the desired direction of the line to be drawn, until 30 registers with the index, as shown in Fig. II. It may be desirable to provide the board with a brake for holding the same in place while the set-screw is being screwed down, and in such event I provide a lever, 15, which has an arm, 16, pivoted to the arm or piece 2, and bent inwardly and carrying in the cavity 17 a brake-shoe, 18, which engages the periphery of the board 1 when the lever 15 is oscillated in either direction, and only disengages when the latter is parallel with the edge 5. The shoe 18 may be provided with short teeth, as shown. This lever 15 is given considerable length, so that the fingers of the hand of the operator may grasp it, Fig. III, while holding the T-square at either extremity of its necessary movement.

In Fig. IV I show a guard, 19, which may be made integral with the arm 2, projecting beyond the lower edge of the board 1, and having an enlarged foot adapted to rest against the body of the user, and thus support the board, as well as prevent the user's clothing interfering with its revolution.

In Fig. VIII the shoe 4 is formed with a groove, 20, the edges of which are under-cut and the edges of the head 6 of the T-square are beveled so as to fit in said groove and be retained in place thereby, as shown. This form of shoe may of course be used with the board just described, and also with any desired brake and guard.

In Fig. IX the guard 19 is shown as a continuation of the shoe 4 and carrying the guide-bracket 8. In this form there is no clamp-screw used; but a brake-shoe, 21, is substituted therefor. This brake-shoe is hinged near its inner end between two ears, 22, cast on the lower lip of the bracket 7. The lower lip of the bracket 7 in this instance, however, has an extension-plate, 23, to which is pivoted a long lever, 24, carrying at its short end a cam-head, 25, which being flat on its side next the said plate is, however, on its other side beveled in two directions—longitudinally and transversely—and when the lever is operated in the one direction wedges between the bracket 7 and end 26 of the brake-shoe, and thereby forces the latter firmly into engagement with the lower side of the board 1. The lever 24 extends lengthwise of the edge 5 for a considerable distance, for the purpose before described, and the arm or piece 2 is provided with a number of teeth, 27, over any of which the lever may be hooked and thus hold the brake on. Of course when this form of brake is used the brake 15 16 18 is unnecessary.

In Fig. XIII the ears 22 are shown formed flush with the lower lip or plate of the bracket and not diagonally thereon, as in the previous form, and the brake-shoe 21 is wedge-shaped and is without the extension 26, but is pivoted or hinged directly at its end between the two ears. With this form of shoe it is not necessary to employ a lever with the cam-head, as the flat end 28 will, when turned, engage the wedge-shaped shoe and crowd it firmly against the board.

The remaining form of brake, Fig. XV, is a simple modification of that just described, the lever being substantially the same; but the lower lip of the bracket being flattened out to give it flexibility and having the wedge-shaped shoe 21 formed integral therewith, and in this instance the bracket is without the plate 23, the lever being pivoted directly to the shoe 4 by means of the screw 29.

It is very desirable that the brake used should produce the pressure at right angles to the face of the board, so that the latter may not be slewed out of place by the application thereof. Therefore, I have devised these forms in preference to many others that could be made.

It will be observed that my object is to pivot the T-square or other straight ruling-edge to the board in such a manner as to compel the former to maintain the same position relative to the diameter of the board at all times, whether it is placed high or low on the latter. In the first form described any form of T-square may be employed. Here the connection between the board and the square depends upon the hand of the user for holding the head of the square in place against the edge 5; but in the form represented by Fig.

VIII the connection is purely mechanical and the T-square is practically pivoted to the board, and also in the form shown by Figs. XVI and XVII the connection between the board and square is mechanical, though any form of square may be used. In this instance (referring to Figs. XVI and XVII) the shoe 4 may be of any of the forms described save that of Fig. VIII, which has secured to its outer edge, by means of screws 30, two bow-springs, 31, which have fastened to their upper ends a long follower, 32, which bears continually upon the head of the T-square, and thus holds the latter firmly to its place, and at the same time permits its longitudinal movement.

In Fig. XVIII the board is represented as having a peripheral groove, 33, and the shoe a double-beveled edge, 34, which fits in said groove, and thus prevents undue wabbling of the board and avoids the necessity of the guide-brackets 7 8.

In Figs. XIX, XX, and XXI the arm or piece 2 is considerably wider than in the previous forms, and the shoe 4 is diminished in length to the width of the arm, and is without the straight-edge 5 for a T-square, and it is preferably located on the right side. It has the usual index, 12, but is without the brackets 7 8, as the arm or piece 2 serves, in conjunction with the set-screw 9, which is carried by a plate, 35, secured to the shoe, as a guide. The guard 19, however, is provided with a shoe, 36, projecting flush with the surface of the board, and having a guide-plate, 37, secured thereto, which overhangs the board. The head 6 of the T-square in this case is preferably as thick as the board 1, and has its corners adjacent to the board rounded to the contour of the latter, in order that the square may have a more extensive movement without increasing its length. This head is pivoted at its ends to two (or more) parallel arms, 38 39, which in turn are pivoted to the arm or piece 2, by which arrangement the square may be raised and lowered on the board, and the ruling-edge of the former will always be parallel with the horizontal diameter of the latter. These arms 38 39 should be composed of metal and pivoted to metal plates 40 on the piece 2 and T-square, respectively, and it is also preferable to pivot them through ears 43 on their outer sides to the outer side of the piece 2 and through ears 42 on their inner sides to the under side of the head 6, whereby the latter will be in a plane with the board 1 and the arms 38 39 will be supported against the bottom of the latter. The set-screw 9 may be employed for locking the board, or it may be substituted by any of the forms of brakes before described.

The lower face of the shoe 4 and the end of the arm 2, or both ends of the arm 2 and the lower end of the guard 19, as the case may be, may be provided with sockets 44 for the insertion of supports or legs 45, as shown in dotted lines in Fig. III, for use when it is desired to use the board horizontally on the table.

Having thus described my invention, the following is what I claim as new therein and desire to secure by Letters Patent:

1. The combination, with a revoluble drawing-board, of a T-square or ruler pivoted thereto, substantially as described, and for the purposes set forth.

2. The combination, with a circular revoluble board, of a T-square or ruler pivoted thereto and adapted to rest upon the face thereof, substantially as described, and for the purposes set forth.

3. The combination, with the circular board, of the shoe pivoted thereto and a brake for clamping said shoe and board together, substantially as set forth.

4. The combination, with the circular revoluble board, of a shoe having a curved edge fitting partly around said board and leaving a portion of the latter's periphery exposed, an arm pivoting said shoe to said board, and a brake adapted to clamp said shoe and board together, substantially as set forth.

5. The combination, with the revoluble board, of a shoe pivoted to said board adjacent to its periphery and leaving a portion of the latter exposed, a brake for clamping said board and shoe together, and the guard for shielding the lower portion of the periphery of the board, substantially as set forth.

6. The combination, with the circular revoluble board having degrees marked on its outer edge, of a shoe pivoted thereto, an index on said shoe, and a guide secured to said shoe for preventing said board wabbling, substantially as set forth.

7. The combination, with the revoluble board, of a guard for the purpose described, a shoe pivoted to said board and connected to said guard, and a straight-edge for guiding the T-square formed on the face of said shoe remote from its edges, substantially as set forth.

8. The combination, with the revoluble board, of a guard for the purpose described, a shoe pivoted to said board and connected with said guard, and a straight rabbet or groove formed in said shoe for guiding the T-square, substantially as set forth.

9. The combination, with the revoluble board, of the arm or piece carrying a guard pivoted thereto and a T-square or ruler pivoted to said arm or piece, substantially as set forth.

10. The combination, with the revoluble board, of an arm or piece to which said board is pivoted, a guard carried by said arm, a T-square or ruler, and parallel arms pivoting said T-square or ruler to said piece, substantially as set forth.

11. The combination, with the revoluble board, of a piece to which said board is pivoted, a brake carried by said piece and adapted to engage said board, a T-square or ruler, and parallel arms pivoting said T-square or ruler to said piece, substantially as set forth.

12. The combination, with the revoluble board, of the shoe 4, having the groove or rabbet therein for guiding the T-square, and a spring-actuated follower adapted to rest against the T-square, and thereby hold it to its place in said groove, substantially as set forth.

13. The combination, with the revoluble board, of the shoe 4, pivoted thereto and having a straight-edge for guiding a T-square, a follower, and a spring for forcing said follower toward said edge, substantially as set forth.

F. A. HOPKINS.

Witnesses:
H. L. KNIGHT,
GEO. T. SMALLWOOD.